Sept. 29, 1942.  P. W. CRIST  2,297,346
MEASURING INSTRUMENT
Filed Aug. 3, 1940  2 Sheets-Sheet 1

INVENTOR
PHILIP W. CRIST
BY Olew E. Bee
ATTORNEY.

Sept. 29, 1942.   P. W. CRIST   2,297,346
MEASURING INSTRUMENT
Filed Aug. 3, 1940    2 Sheets-Sheet 2
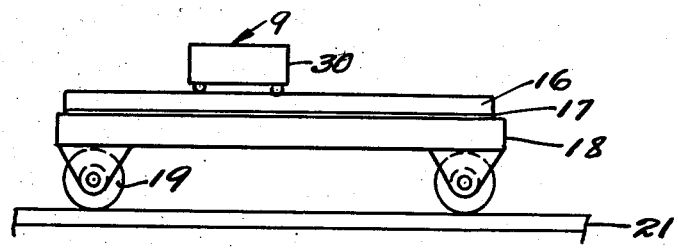
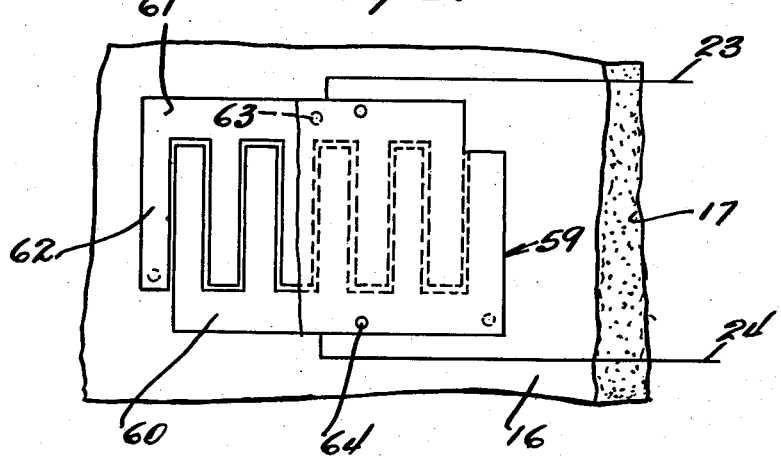
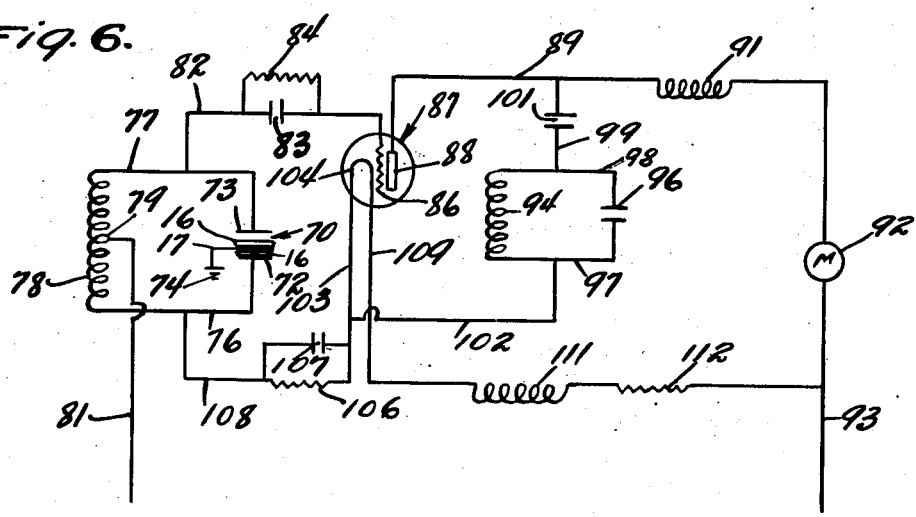
INVENTOR
PHILIP W. CRIST
BY Olew E. Bee
ATTORNEY.

Patented Sept. 29, 1942

2,297,346

UNITED STATES PATENT OFFICE 2,297,346

MEASURING INSTRUMENT

Philip W. Crist, Pittsburgh, Pa., assignor to Pittsburgh Plate Glass Company, Allegheny County, Pa., a corporation of Pennsylvania Application August 3, 1940, Serial No. 350,946

3 Claims. (Cl. 175—183)

The present invention relates to processes of and apparatus for determining dielectric value, thickness, state or condition and such like properties of a material, and it has particular relation to processes and apparatus designed for making such observations by measurement of the effect of the material upon the capacity of a set of juxtaposed electrodes arranged to provide an electrostatic condenser with the material in the field thereof.

One object of the invention is to provide a process of and apparatus for determining dielectric value or characteristics, which influences dielectric value, of a material that is in the form of extensive sheets or bodies or is so situated or conditioned that the values cannot be determined conveniently by conventional methods and apparatus.

A second object is to provide such apparatus in inexpensive, simple, compact and highly portable form.

A third object of the invention is to provide a process and apparatus of the foregoing type which is not subject to a disturbing influence of bodies in the neighborhood in which determinations are being made, or by other factors likely to be present.

These and other objects of the invention will be apparent from consideration of the following specification and the appended claims.

The determination of dielectric value and other values of materials, notably in the form of extensive sheets or bodies so mounted upon supports as to be but partially accessible, often present serious difficulties, because in most determinations it is necessary to obtain access simultaneously to both surfaces of the material to be measured. One method proposed for making such determinations involves juxtaposition of spaced metallic conductors adjacent to opposite faces of the material in such manner that the conductive bodies constitute an electrical condenser whose capacity is a function of the dielectric constant and the thickness of the material disposed in the field thereof. Upon application of a high frequency alternating electrical voltage to the conductive bodies the variations in the capacity of the condenser are easily observed and from them the properties of the materials can be estimated. In this way such properties as dielectrical value, thicknesses of the material between the conductors and various other properties can be determined. Apparatus of this type, however, is bulky and usually is of necessity of stationary character. Moreover, it is often subject to influences of bodies adjacent thereto and is subject to other variables which often are difficult to predict. In many instances, as for example, when it is desired to determine thickness, or dielectric value of a sheet of glass cemented upon a polishing car or table, this type of measurement is practically, if not completely, impossible, because of inability properly to juxtapose a suitable conductor to the surface which is cemented to the table or car.

In accordance with the provisions of the present invention it is proposed to obviate the foregoing difficulties by provision of a condenser including a pair of laterally spaced conductors, or electrodes, which can be juxtaposed to a single surface of a sheet of material and which, when subject to an alternating voltage, induces an electrostatic field, which passes through the material from one side and again returns to emerge from the same side. By means of apparatus of this type a dielectric value and properties upon which such values depend can easily be determined even in bodies in which access only to a single surface can be obtained. Moreover, by suitable arrangement of the conductors of the condenser it is possible greatly to reduce or to minimize the effects of neighboring bodies or the movement of neighboring bodies upon the capacity of the condenser.

For a better understanding of the invention reference may now be had to the accompanying drawings in which Figures 1 and 6 are wiring diagrams of suitable circuits in which the condensers constituting the subject matter of the invention may be employed.

Figure 4 illustrates the application of the invention to the measurement of properties related to dielectric value of a sheet of glass upon a polishing car.

Figure 5 is a fragmentary view showing a modified form of capacitance for use in practicing the invention.

In the drawings numerals refer to like parts throughout.

Figure 1:
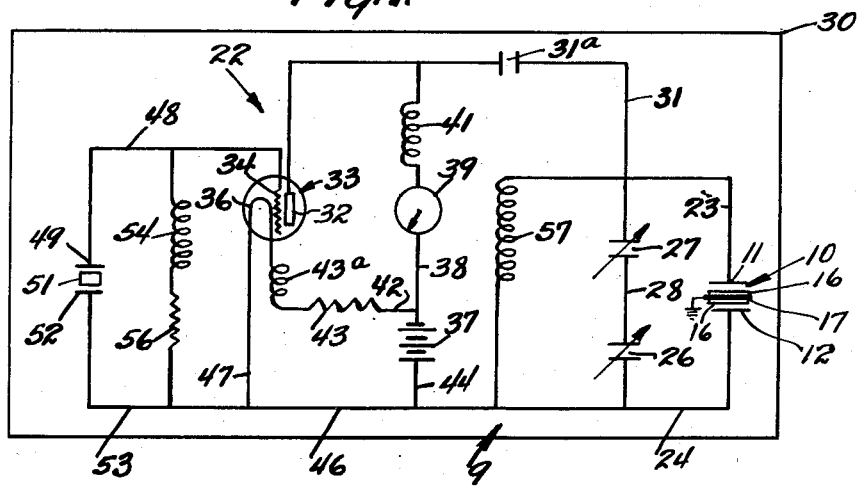
Figure 2:
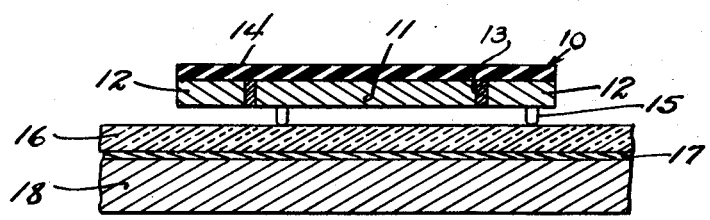
Figure 2 is a fragmentary cross-sectional view of one form of condenser or capacitance involving the principles of the invention.
Figure 3:
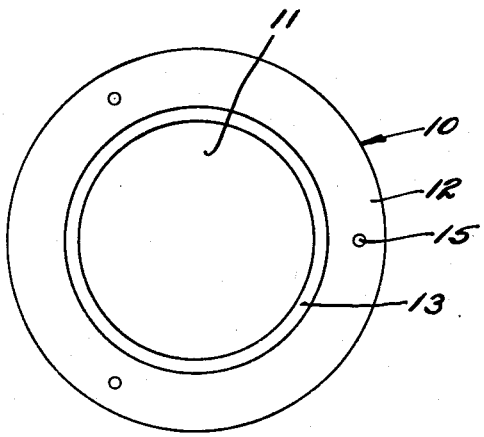
Figure 3 is a plan view of the condenser shown in Figure 2.

The apparatus 9, as shown diagrammatically in Figures 1, 2 and 3, involves a capacitance constructed in accordance with the present invention and connected into a circuit designed to amplify minute changes in current in the circuit, due to changes in the dielectric value of the material to be tested and then to determine the value of such changes. Dielectric value as herein employed depends upon the ratio of dielectric constant of the material to the thickness. The apparatus includes as a main element a capacitance 10 constructed in accordance with the provisions of the invention and including a pair of conductor plates or electrodes 11 and 12, which are suitably and laterally spaced and insulated from each other, but are preferably disposed approximately in a common plane. The device, for purposes of convenience, may be termed a coplanar condenser because its plates are in a single plane. It may include a central disk constituting the electrode 11 and an annular disk 12 disposed thereabout. These disks are suitably secured in insulated relation with respect to each other to a backing 14 of an insulative material, such as Bakelite or other non-conductive plastic. The lower face of one or both of the disks is provided with small projections 15 designed to rest upon the surface of a material, such as a sheet of glass 16, which is to be tested and to maintain the spacing between the surface and the disks.

The glass, as shown in Figures 2 and 4, may be cemented by means of a layer 17 of plaster of Paris or other suitable cementing body to the upper surface of a grinding and polishing car 18, which is provided in conventional manner with wheels 19 travelling upon a track 21, in order to conduct the surface of the glass under grinding and polishing disks (not shown). The layer of cement usually contains considerable amounts of free water, as well as more or less soluble salts, which impart thereto electric conductivity. This is particularly true in grinding and polishing operations where the glass is subjected to repeated applications of a water slurry of sand, and a certain amount of water of necessity obtains contact with any exposed plaster, thus keeping the latter constantly wetted.

From Figure 2 it will be apparent that if an alternating electrical voltage is impressed upon one of the disks 11 or 12 an electric field will be generated in the vicinity thereof and a portion of this field will travel downwardly through the dielectric material, e. g., a sheet of glass 16 and will induce electrostatically a voltage in the conductive cement 17, which in turn will cause an electrostatic field to be generated, which will influence the other disk of the pair.

In order to induce an alternating voltage of high frequency upon one of the plates, e. g. the plate 11, and also to admit of determination of the variable capacity between the elements 11 and 12, the conductors are connected in circuit with a generator 22 of high frequency or radio frequency alternations, which also acts in effect as an amplifier to increase the sensitivity of the apparatus to small changes in the capacity of unit 10, due to the effect of the material to be tested. The circuit includes conductors 23 and 24 connected respectively to the conductors or disks 11 and 12 and arranged in series with a pair of condensers 26 and 27, preferably of variable type. These two condensers are also connected in series with each other by means of a conductor 28, which is grounded to a metallic case 30, providing a shield about the electrical instrumentalities of the device. Since conductive material 17, backing plate 16, is grounded to the earth through the car 18, a Wheatstone bridge effect is obtained, in which the capacity between conductor 17 and plate 11 and that between conductor 7 and plate 12 provide one side.

The branches of the bridge are joined by a conductor 31 containing a condenser 31a with the plate 32 of a conventional three electrode or triode electronic valve or radio tube 33, having a control grid 34 disposed between the plate and its filament 36. A positive plate voltage may be impressed on the plate 32 by means of a battery 37, which is connected to conductor 31 by means of conductor 38, micro-ammeter 39 and a radio frequency choke coil 41. The battery is also connected to supply filament current to filament 36 by means of conductor 42 and the control rheostat 43 and choke coil 43a upon one side and by means of conductors 44, 46, and 47 upon the other side.

Control grid 34 is connected by conductor 48 to one electrode 49 of piezo crystal 51 of quartz or other suitable material. The opposite face of the crystal contacts with a second electrode 52, which is connected by conductor 53, with conductor 46, to form a grid circuit. The crystal is also connected in parallel with a radio frequency choke coil 54 and a resistance 56, by means of which the resonance characteristics of the grid circuit may be determined and controlled.

In order to facilitate maintenance of resonance between the grid circuit and the plate circuit of the electronic valve or tube, a radio frequency coil 57 is connected to conductors 23 and 24.

In the operation of the apparatus the condensers 26 and 27 are adjusted to obtain a Wheatstone bridge balance with the elements of the condenser or capacitance 10. Such balance when attained is permanent and need not be made again. The grid and plate circuits are also adjusted to obtain resonance when the capacitance of unit 10 is at some predetermined value. When the proper adjustment has been attained the condenser 10 may be disposed above a surface of any body which is to be tested, e. g. the plate of glass 16. It will be manifest that assuming that the plate circuit has been adjusted to obtain resonance with the grid circuit with the unit 10 at its natural capacity, any change in that capacity, for example such as may be induced by placing the discs or plates 11 and 12 adjacent to plate 16, will tend to reduce the resonance of the circuit and produce a variation, for example, a reduction in the plate current as measured by the micro-ammeter 39. The total dielectric value of the plate-like body 16 is a function of the thickness. By calibration of the instrument with plates of known thickness, it is possible to determine the thickness of a test plate merely from the meter reading. Thickness or dielectric constant may also be approximately determined by the formula:

$$C = \frac{KA}{4\pi X}$$

In this formula C equals the capacity of the condenser, K is the dielectric constant of the sheet, A is the area of the electrodes or plates, X equals the thickness of the dielectric sheet, $\pi$ of course represents the ratio between the circumference and the diameter of a circle and may be assumed to be 3.14. Assuming that C is determined by means of the apparatus and K and A are known, X, the thickness of the plate can be calculated.

In Figure 5 of the drawings is shown the modified form 59 of coplanar capacitance suitable for use in place of the unit 10. It includes a pair of comb-like elements 60 and 61 having spaced teeth 62, which intermesh, but do not physically contact with each other. Elements 60 and 61 are also provided upon their lower surfaces with protuberances 63 which function as do protuberances 15 to support the device in a definite spaced relation with respect to the surfaces to be tested. The relationship of the two elements 60 and 61 may be maintained in any convenient manner, for example, by means of a plate of non-conductive plastic superposed thereupon and secured thereto by means of screw fastenings 64. The capacitance is connected as indicated to the conductors 23 and 24, shown in the circuit in Figure 1.

In Figure 6 is shown the use of the principles of the invention in connection with an amplifying and measuring circuit designed for operation from conventional alternating current supply. In this embodiment of the apparatus the capacitance employed in generating an electrostatic field in the material to be tested may be of the forms shown in either Figures 3 or 5, or of any other equivalent construction and is indicated in the drawings at 70. It includes coplanar conductors or electrodes 72 and 73, which in the actual physical embodiment of apparatus are approximately in the same plane and are designed to rest upon or near to a single surface of a material, such as sheet 16 of glass, which is backed by a suitable conductive material, such as layer 17 of plaster of Paris, the latter of course is suitably grounded, as indicated at 74 by the car upon which it is disposed. This condenser is connected by lines or conductors 76 and 77 in parallel circuit with a radio frequency coil 78, which is tapped at an intermediate point 79 by line 81, so that the coil and coplanar condenser 70 provide a balanced bridge. Line 81, also, constitutes a supply line for the alternating current employed to energize the circuit. Line 82 having a grid condenser 83 and a grid leak 84 connects line 77 to the grid 86 of a conventional triode tube 87. The plate 88 in the latter is connected by line 89 containing radio frequency choke coil 91 to milliammeter 92 in current supply line 93.

The plate circuit is preferably tuned to resonance with the circuit of coil 78 and condenser unit 70 by means of a coil 94 and condenser 96, which are interconnected at their poles by conductors 97 and 98. The latter is joined by conductor 99 in circuit with condenser 101 to the plates of supply line 99. The line 97 between coil 94 and condenser 96 is connected by line 102 to one side, 103 of filament 104 of the valve 87. The same side of the filament is also connected by resistance 106 and parallelly connected condenser 107 and line 108 with line 76 of the bridge circuit. The other end of the filament 104 is joined by line or conductor 109, choke coil 111 and resistance 112 to current supply line 93.

In the operation of this embodiment of the apparatus it is to be understood that the bridge circuit containing the unit 70 is so adjusted that electrical balance is obtained between the ground 74 and the connecting point 79 of the supply line 81. This balance is maintained permanently. The tuned circuit containing the coil 94 and condenser 96 is also so adjusted as to obtain resonance between the plate and the grid of the electronic valve or triode tube 87. When these conditions are obtained the unit 70 may be suitably disposed with the conductors 72 and 73 adjacent to the surface of the material to be tested, e. g. a sheet of glass. Any variation of capacity in the unit 70, due to the introduction of the dielectric material 16 and the conductive material 17 into contiguity with the conductors 72 and 73, of course increases or decreases the total capacity of the grid circuit of the tube, and therefore tends to throw it out of resonance with the plate circuit. The disturbance in resonance changes the flow of current in the plate circuit, which change is indicated by the milliammeter 92. Since the changes in capacity of the unit 70 are proportional to the thickness of the material 16, it will be apparent that the current recorded by the ammeter 92 varies with the thickness of the material tested.

By proper calibration of the instrument by samples of known thickness it is possible readily to determine the thickness of large sheets of material, such as sheets of glass, even when one surface is completely inaccessible. The readings may be made continuously or intermittently even while the cars are in motion in the polishing line.

The system herein disclosed may be used for many purposes, such as determination of dielectric constant of dielectrical materials of known thickness, thickness of materials of known dielectric constant. The system may, also, be applied to study of paint or varnish films on a metal surface. In such case the coplanar capacitance unit is applied adjacent to the surface of the film while the metal backing is grounded or not, as preferred, and a reading is made which by comparison with calibration curves can be interpreted. Films of rust, between the metal and the paint, air bubbles, in or under the films and flaking of the film are manifested in the readings obtained from the system.

The forms of the invention herein shown and described are to be considered merely as exemplary. Numerous modifications may be made therein without departure from the spirit of the invention or the scope of the following claims.

What I claim is:

1. A method of determining dielectrical properties and properties upon which they depend in dielectrical material adhering to a conductive backing, which method comprises grounding the backing and making it a common electrode of a pair of capacitances in bridge circuit, impressing a high frequency voltage on the circuit and determining the effect of the overall capacity of the bridge circuit upon the supply of high frequency voltage.

2. A method of determining dielectrical and related properties in a dielectrical material adherent upon a conductive backing, which method comprises making the backing a common electrode of a pair of capacitances in a bridge circuit in the circuit of a tuned generator of high frequency voltage, and observing the effect of the capacity of the capacitances upon the current due to changes in the tuning of the circuit.

3. A method of determining thickness of a glass plate while it is bonded by means of an intermediate layer of plaster to the top of a grinding and polishing car, which method comprises juxtaposing a pair of electrodes to the exposed surface of the plate in position to make of the layer of plaster a common grounded electrode of a pair of capacitances, said pair of electrodes being connected in a tuned circuit containing a source of high frequency voltage, and observing the effect of changes in tuning of the circuit due to the presence of the capacitances on the circuit.

PHILIP W. CRIST.